United States Patent [19]

Clough

[11] Patent Number: 5,131,516
[45] Date of Patent: Jul. 21, 1992

[54] PARKING TICKET DISPENSER

[76] Inventor: Paul T. Clough, 565 Inglewood, West Vancouver, British Columbia, Canada

[21] Appl. No.: 425,556

[22] Filed: Oct. 23, 1989

[30] Foreign Application Priority Data

Sep. 29, 1989 [CA] Canada ............................. 614861

[51] Int. Cl.⁵ ............................................. G07F 7/08
[52] U.S. Cl. .................... 194/205; 194/350; 235/381
[58] Field of Search ............... 194/210, 350, 902, 205; 235/381; 364/479; 221/281

[56] References Cited

U.S. PATENT DOCUMENTS

| | | | |
|---|---|---|---|
| 2,742,338 | 4/1956 | Abbott | 312/39 |
| 2,936,057 | 5/1960 | Alimanestiano et al. | |
| 3,270,847 | 9/1966 | Rudberg | |
| 3,575,586 | 4/1971 | Kroll | |
| 3,750,790 | 8/1973 | Cresswell-Clough | 194/234 |
| 3,815,718 | 6/1974 | Singer | |
| 4,065,663 | 12/1977 | Edwards, III | |
| 4,310,890 | 1/1982 | Trehn et al. | |
| 4,350,264 | 9/1982 | Muller | 221/281 X |
| 4,379,334 | 4/1983 | Feagins, Jr. et al. | |
| 4,460,965 | 7/1984 | Trehn et al. | |
| 4,532,418 | 7/1984 | Meese et al. | |
| 4,571,490 | 2/1986 | Hidemi et al. | |
| 4,579,214 | 4/1986 | Volk | 194/350 |
| 4,587,410 | 5/1986 | Milnes | |
| 4,603,390 | 7/1986 | Mehdipour et al. | |
| 4,703,164 | 10/1987 | von Ballmoos | |
| 4,716,799 | 1/1988 | Hartmann | 364/479 X |
| 4,717,815 | 1/1988 | Tomer | |
| 4,730,285 | 3/1988 | Lie | |
| 4,773,020 | 9/1988 | Anderson et al. | |
| 4,778,983 | 10/1988 | Ushikubo | |
| 4,786,787 | 11/1988 | Nawada et al. | |
| 4,876,540 | 10/1989 | Berthon et al. | 194/902 X |
| 4,970,655 | 11/1990 | Winn et al. | 235/381 X |

Primary Examiner—F. J. Bartuska
Attorney, Agent, or Firm—Ostrolenk, Faber, Gerb & Soffen

[57] ABSTRACT

A parking ticket dispenser of the type to dispense a parking ticket upon payment of a required fee is provided. The parking meter includes a substantially rectangular shaped housing mounted on a pole extending upwardly from the ground. A coin receptacle projects forwardly from the front wall of the housing and is operable to receive payment of the required fee in the form of coins. A credit card reader is also provided in the front wall for receiving payment of the required fee via a valid credit card. A microprocessor-based circuit is disposed within the housing and is in communication with the credit card reader. The circuit includes appropriate software for detecting whether a credit card received by the credit card reader is valid and for recording credit card transactions. A dispensing mechanism is in communication with both the coin receptacle and the microprocessor-based circuit and is operable to dispense a parking ticket from the housing via a slot provided in the front wall upon receipt of payment of the required fee in either coin or credit card form.

24 Claims, 12 Drawing Sheets

PARKING TICKET DISPENSER

The present invention relates to a dispensing device and in particular to a parking ticket dispenser of the type to dispense a parking ticket upon receipt of payment of a required fee.

Dispensing devices of the type to dispense an article upon payment of a required fee are well known in the art and are used in many environments. Typically, these dispensing devices include a coin receptacle or a bill receptacle for receiving payment of a pre-determined fee from a user. When the required payment has been received, the device operates to dispense a purchased article.

These types of dispensing devices are often used in parking lots and are in the form of parking ticket dispensers. When it is desired to park in a parking space associated with such a parking ticket dispenser, the user must deposit coins totalling the required fee in the slots of the coin receptacle. Thereafter, the user must push the arm of the coin receptacle into the housing to deposit the coins therein. Once the required fee has been paid, the parking ticket dispenser dispenses a ticket and the arm of the coin receptacle springs back to its initial position so that additional parking tickets can be purchased. After the parking ticket has been dispensed, the user places the ticket on the dashboard of the vehicle to verify payment of the required parking fee. However, a problem exists in these types of parking ticket dispensers in that payment of the required fee can only be made using coins. Thus, a user who does not have any coin money in their possession, is unable to use the parking ticket dispenser to purchase parking time.

It is therefore an object of the present invention to provide a novel parking ticket dispenser.

Broadly stated, the present invention provides a parking ticket dispenser of the type to dispense a parking ticket upon receipt of payment of a required fee comprising:
  a housing;
  credit card receiving means disposed on said housing;
  monetary receiving means disposed on said housing;
  payment detection means in communication with said credit card receiving means and said monetary receiving means for detecting payment of said required fee by a user; and
  dispensing means responsive to said payment detection means and being operable to dispense a parking ticket upon detection of payment of said required fee by said payment detection means.

Preferably, the monetary receiving means is in the form of a coin receptacle or a bill receiving mechanism. It is also preferred that the housing is substantially rectangular in shape and that the credit card receiving means and the coin slot are located on one side of the housing.

Preferably, the payment detection means includes a coin receiving and storing mechanism and a microprocessor-based circuit, the coin receiving and storing mechanism being associated with the coin receptacle and the microprocessor-based circuit being associated with the credit card reader. It is also preferred that the microprocessor-based circuit includes software for detecting valid credit cards, for storing transactions and for permitting the transfer of the stored transaction data to a remote reading device Furthermore, it is also preferred that the meter includes an isolated power supply in the form of a battery to provide power to the components in the parking ticket dispenser.

The present parking ticket dispenser provides advantages in that the device is operable to dispense a parking ticket upon receiving payment of a required fee from a user in the form of either credit cards, bill money or coin money. This allows the user to pay for the parking ticket in any manner that is convenient. Furthermore, since the present device detects valid credit cards, stores credit card transactions and allows the stored transactions to be transferred to a remote reading device, the present device is not required to be connected to the central computer of the credit card company. This, of course, decreases costs.

Embodiments of the present invention will now be described by way of example only with reference to the accompanying drawings in which.

Figure 1:
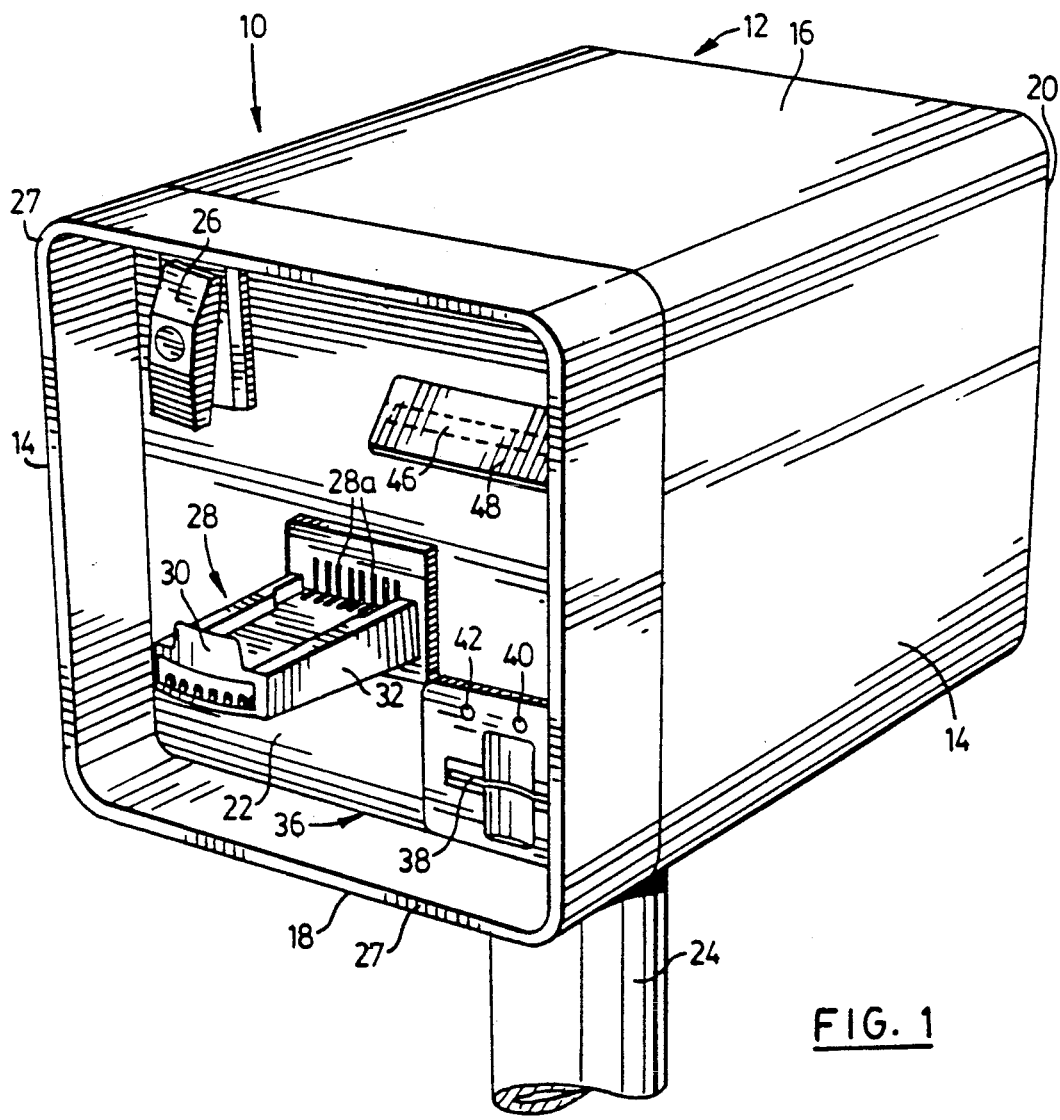
FIG. 1 is a perspective view of a parking ticket dispenser.

Referring to FIG. 1, a parking ticket dispenser is shown and generally indicated by reference numeral 10. The dispenser 10 includes a substantially rectangular shaped housing 12 having a pair of side walls 14, top and bottom walls 16 and 18 respectively, and rear and front walls 20 and 22, respectively. A vertical post 24 depends from the bottom wall 18 and is secured in the ground to maintain the dispenser 10 in an upright position. The front wall 22 is recessed with respect to the front edge 27 of the housing 12 and is removably secured to the housing 12 via a conventional key locking mechanism 26. When the locking mechanism 26 is released, the front wall 22 can be removed from the housing 12 to permit entry into the interior of the parking ticket dispenser 10 and to permit access to the components stored within the housing 12.

A coin receptacle 28 is centrally located on the front wall and protrudes therefrom. The coin receptacle 28 is of a conventional design and includes a plurality of slots 28a for receiving coins. The coin receptacle 28 has a slidable arm 30 seated in a guide 32. The arm 30 can be pushed along the guide 32 into the interior of the housing 12 when a pre-determined amount of money in the form of coins is placed in the slots 28a of the coin receptacle 28.

A horizontal elongate slot 38 and red and green coloured LEDS 40, 42 respectively are also provided on the front wall 22 of the housing. A credit card reader 36 is disposed within the housing adjacent the slot 38 to receive a credit card placed in the slot. Indicia (not shown) covers a substantial portion of the front wall 22 above the coin receptacle 28 and the LEDs 40,42 36 to provide instructions to a user indicating how to use the parking ticket dispenser 10 and to indicate the purchase price for a parking ticket A protective coating is placed over the front wall 22 to prevent wear and removal of any indicia placed on the front wall A slot 46 covered by a canopy 48 is also provided in the front wall 22 to permit a parking ticket to be dispensed from the housing 12 upon receipt of payment of a required fee in either coin or credit card form. The canopy 48 prevents direct access to the slot 46.

Figure 2:
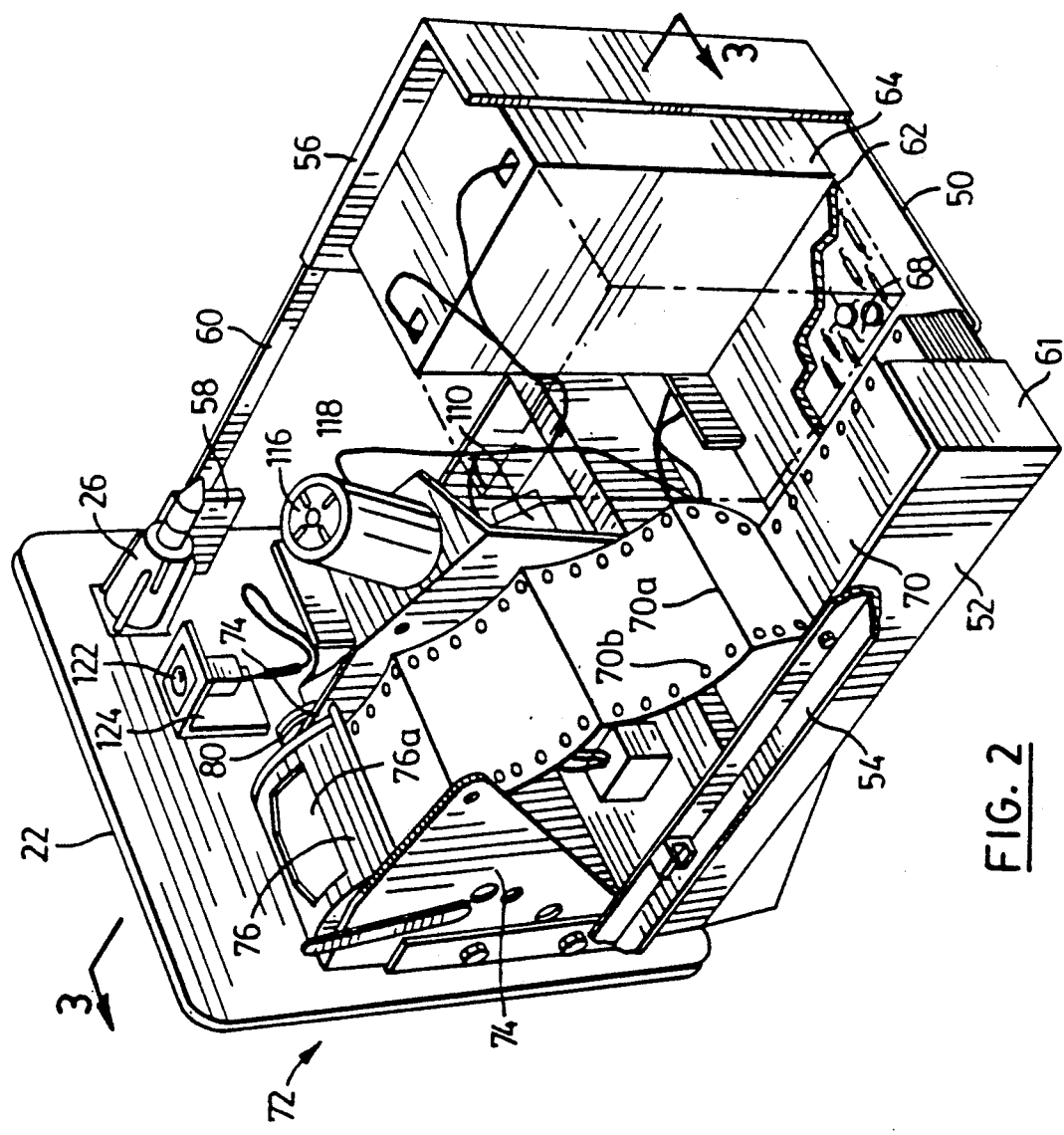
FIG. 2 is a perspective view of a portion of the dispenser illustrated in FIG. 1.
Figure 3:
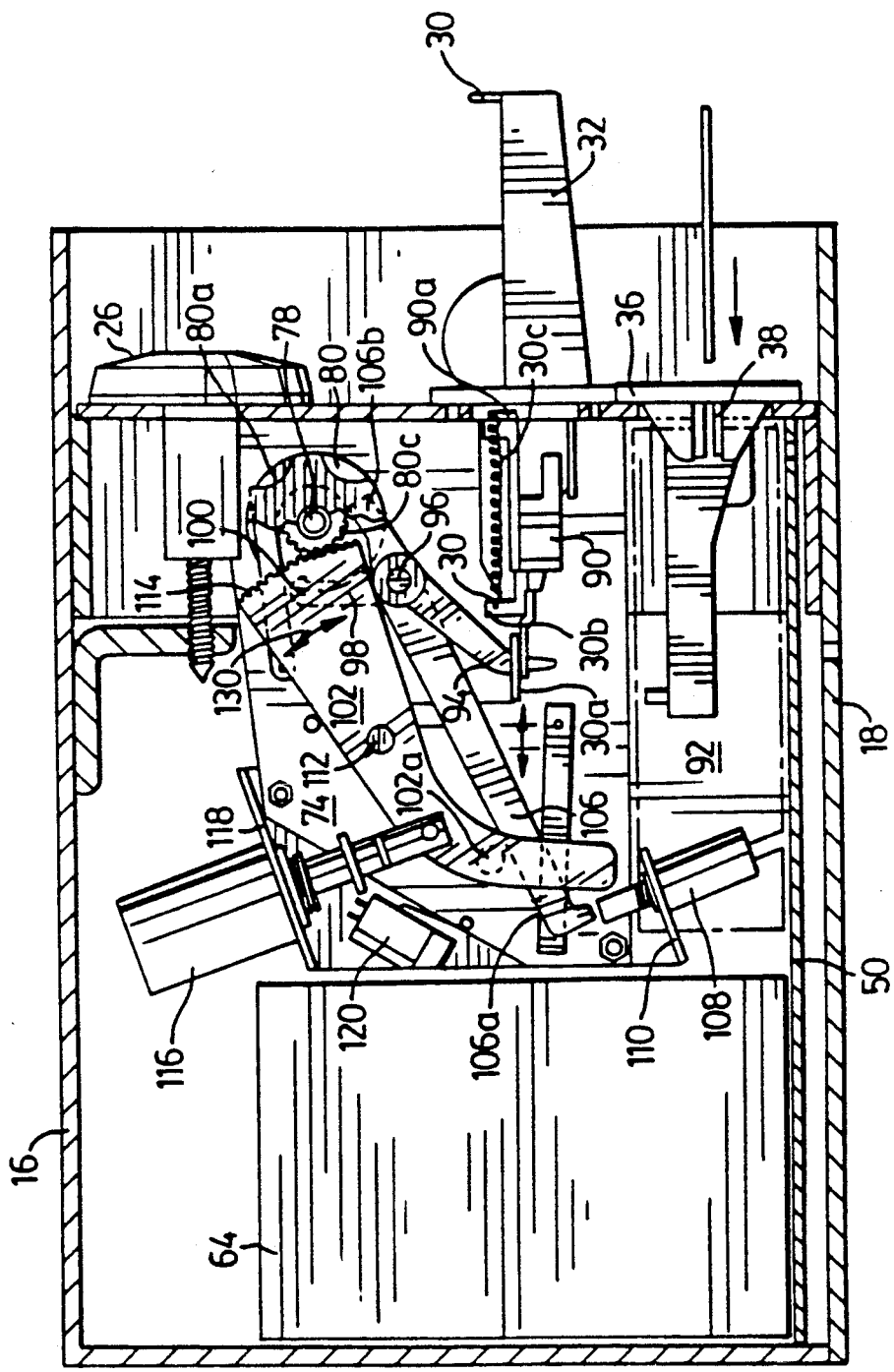
FIG. 3 is a sectional view of the portion illustrated in FIG. 2 taken along line 3—3.
Figure 3A:
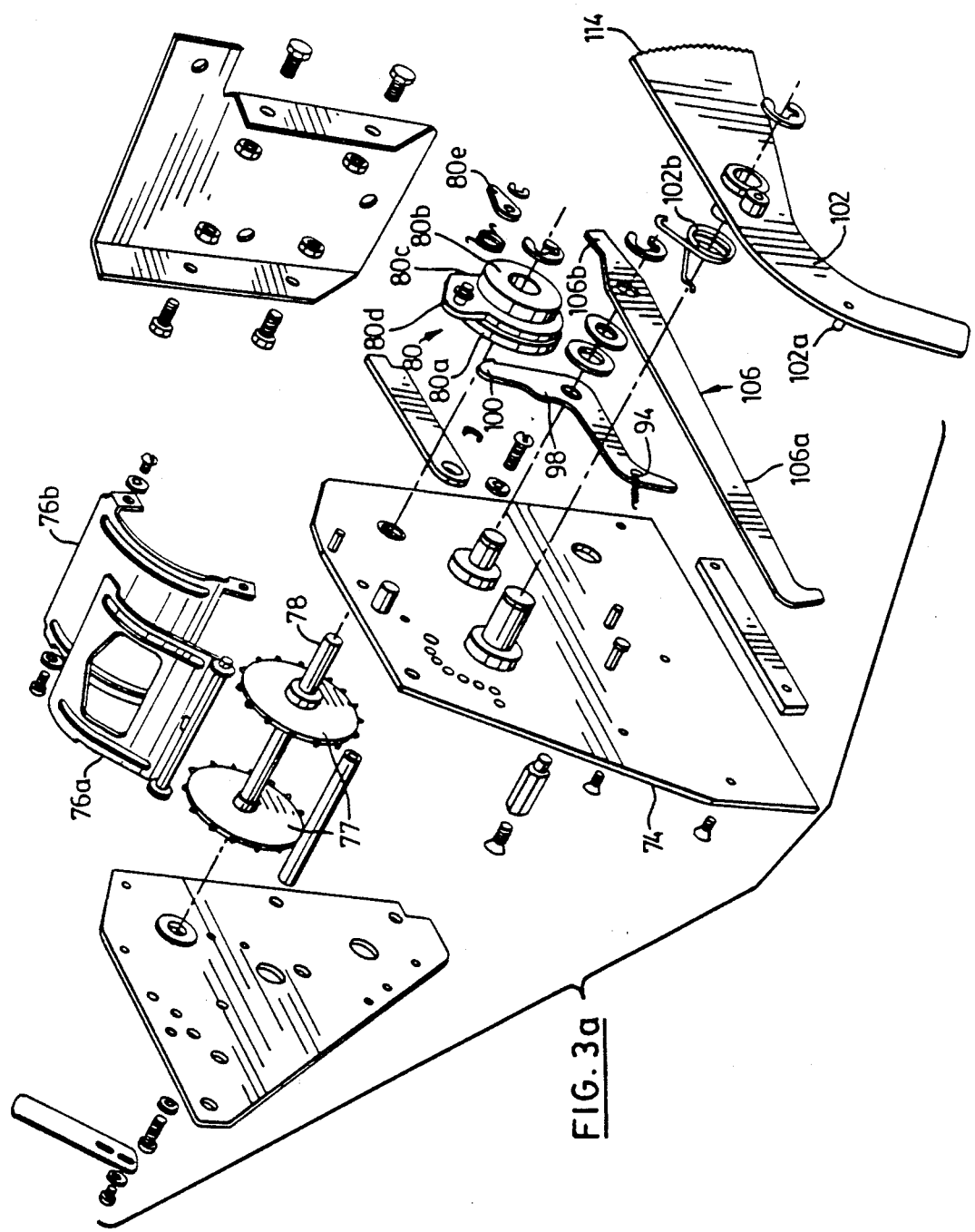
FIG. 3a is an exploded perspective view of a dispensing and indexing mechanism used in the dispenser shown in FIG. 1.
Figure 4:
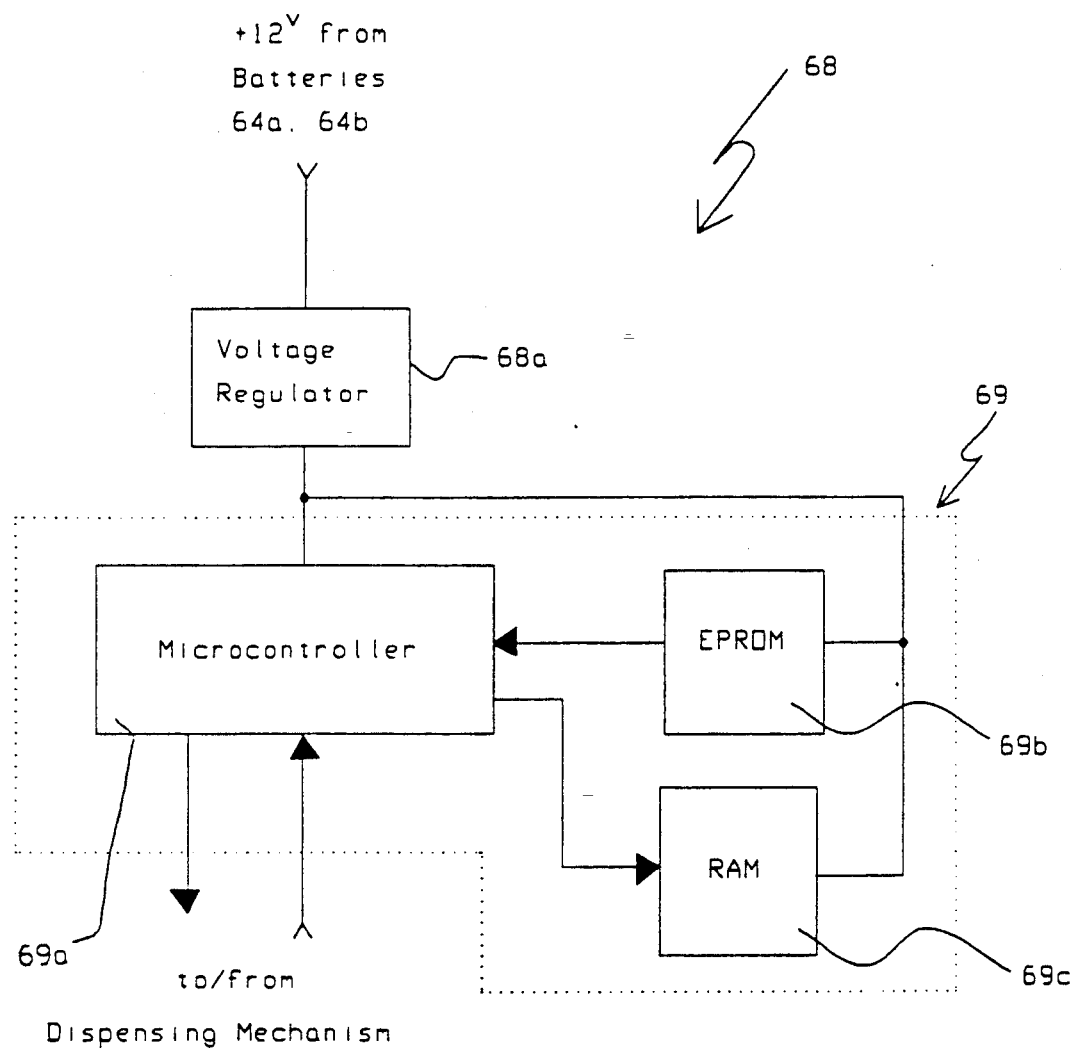
FIG. 4 is a block diagram of a component of the dispenser illustrated in FIG. 1.

Referring now to FIGS. 2 to 4, the interior of the parking ticket dispenser 10 is better illustrated. . As can be seen, a base member 50 is secured to the inner surface of the front wall 22 and extends rearwardly therefrom into the housing. A side wall 52 extends along the length of the base member 50 and supports a rail 54.

A second side wall 56 of greater height than side wall 52 extends along a portion of the other side of the base member 50. A flange 58 extends rearwardly from the front wall 22 and has one end of another rail 60 attached thereto. The other end of the rail 60 is secured to the second wall 56. The rails 54 and 60 are slidable along guides (not shown) provided within the housing 12 to facilitate the removal of the front wall and base member 50 from the housing 12 when the locking mechanism 26 is released. Rear walls 61 extend along a portion of the rear edge of the base member 50 and define abutment surfaces as will be described.

A shelf 62 if formed near the rear end of the base member 50 and supports a pair of 12 V D.C batteries 64a, 64b which seat in the corner defined by walls 56 and 61. Circuitry 68 is provided beneath the shelf 62 and is electrically connected to the batteries 64. As can be seen from FIG. 4, the circuitry 68 includes a 12 volt to 5 volt voltage regulator 68a connected to the batteries 64. A microprocessor-based circuit 69 including an Intel NFC800 16-bit microcontroller 69a, a 32 k EPROM 69b, and an 8 or 32 k RAM 69c is powered by the output of the voltage regulator 68a. The microprocessor-based circuit 69 is in communication with the credit card reader 36 and is operable to detect valid credit cards received by the credit card reader and to record credit card transactions as will be described. The microprocessor-based circuit 69 also communicates with a ticket dispensing and indexing mechanism 72 when a transaction has been recorded to effect dispensing of a parking ticket. The mechanism is of a conventional design and is described in U.S. Pat. No. 2,742,338, the contents of which is incorporated herein by reference. Accordingly, a detailed description thereof will not be provided herein.

A recess is defined between the side wall 52 and the side wall of the shelf 62 for holding parking tickets 70 to be dispensed. The parking tickets seat against the corner defined by walls 52 and 61 and are interconnected via perforations 70. The tickets are fed to the dispensing and indexing mechanism 72 so that they may be dispensed one at a time by the parking ticket dispenser 10.

The dispensing and indexing mechanism 72 includes upper and lower guides 76a, 76b which are positioned near the front wall 22 adjacent the slot 46 via a pair of brackets 74. The guides 76 provide a confined path for the tickets 70 from within the housing to the slot 46. A pair of spaced pinwheels 77 are mounted on a dispensing shaft 78 extending between the brackets 74. The pinwheels 77 pass through holes 70b provided along each side of the tickets 70 to facilitate advancement of the tickets. An aperture 76a is formed in the upper guide 76a above the tickets to permit a conventional stamping mechanism (not shown) to stamp the ticket being dispensed if desired.

The dispensing shaft 78 extends through one of the brackets and has cam 80 mounted thereon. The cam 80 comprises three sections, namely an inner section 80a, an outer section 80b and a gear or middle section 80c. The gear section 80c is rotatable in both directions about the dispensing shaft 78 but only causes the dispensing shaft 78 to rotate therewith in one of the directions. Cam notches (not shown) are formed in and circumferentially spaced about the inner and outer cam sections. The middle sections 80c includes a protrusion 80d which supports a pawl 80e. The pawl 80e engages with cam notches formed on the outer section 80b upon rotation of the middle section 80c. The pinwheels 77 are rotatable upon rotation of the cam 80 and hence the dispensing shaft 78 in the one direction to discharge a parking ticket 70 12 via the slot 46 as will be described hereinafter.

The coin receptacle 28 also includes an inner guide 90 which extends into the housing 12 for guiding the arm 30 when it is pushed into the housing. The inner guide 90 has passages formed therethrough for guiding coins that are pushed into the housing via the arm into a bin 92. Similar to conventional coin receptacles, the guide 90 includes mans to prevent the arm from being withdrawn from the housing 12 once it has been pushed therein until the coins are released into the bin 92. The bin 92 rests on the base member 50 beneath the inner guide 90. The inner end of the arm 30 has an L-shaped horizontal crossbar 30a secured thereto for communicating with the dispensing and indexing mechanism 72 as will be described herein. An upturned lip 30b is also formed on the arm 30 and has one end of a spring 30c secured thereto. The other end of the spring 30c is connected to a spring support 90a positioned on the guide 90 adjacent the front wall. The spring 30c is placed in tension when the arm 30 is pushed into the housing thereby providing a biasing force against the movement of the arm 30 so that the arm is repositioned after the coins have been deposited in the bin 92.

A lever 94 forming part of the mechanism 72 is pivotally mounted to a shaft 96. The lever 94 is in communication with the portion of the crossbar 30a extending parallel to the front wall 12. The lever 94 pivots about the shaft 96 when the arm 30 is pushed into the housing 12. A spring (not shown) is connected between the lever 94 and a wall of the housing, so that when the arm 30 is in the position shown in FIG. 3, the spring is in tension. When the arm 30 is pushed into the housing to move the crossbar 30a into the housing away from the lever 94, the spring 94a provides a force to pivot the lever 94 about the shaft 96 in a clockwise direction. A first arm 98 is secured to the lever 94 at one end and extends upwardly from the shaft 96. The arm 98 has a hook 100 provided at its other end for engaging with one of the cam notches formed in the inner section 80a.

Another arm 106 is pivotally mounted to the shaft 96 and has a main portion 106a which extends rearwardly from the shaft 96. The main portion 106a of the arm 106 communicates with a solenoid 108. The solenoid 108 is mounted on a flange 110 secured to the bracket 74 and is responsive to the microprocessor-based circuit 69. The solenoid 108 is energized when payment of the required fee is received via a valid credit card as will be described. A smaller portion 106b of the arm 106 extends towards the cam 80 and is operable to engage cam notches formed in the outer section 80b of the cam 80.

A hooked or quadrant arm 102 is pivotally mounted on a shaft 112 and includes a rack of teeth 114 at one end which mate with the teeth of the gear section 80c. The other end of the hooked arm 102 communicates with another solenoid 116. A spring 102b is included on the arm 102 which winds about the shaft 112 when the arm 102 is pivoted about the shaft 112. The solenoid 116 is mounted on a flange 118 secured to the bracket 74 and is in communication with the microprocessor-based circuit 69. The solenoid 116 pivots the hooked arm 102 about the shaft 112 to wind the spring 102b when it is energized. However, when the solenoid is de-energized, the hooked arm 102 is maintained in the position shown in FIG. 3. A cylindrical stud 102a projects from the arm 102 towards the bracket 74 and communicates with section 106a of arm 106 as will be described.

A sensor switch 120 is mounted to the bracket 74 adjacent the solenoid 116 and detects when the hooked arm 102 has been fully pivoted. An output port 122 is mounted on a shelf 124 which extends rearwardly from the front wall 22. The port 122 is in communication with the microprocessor-based circuit 69 and allows information stored in the circuit to be retrieved as will also be described herein.

The operation of the parking ticket dispenser will now be described. The present dispenser 10 operates in a conventional manner when coins are placed in the slots 28a of the coin receptacle 28 and the arm 30 is pushed into the housing 12. The workings of the parking ticket dispenser in this mode of operation are similar to the parking ticket dispenser described in U.S. Pat. No. 3,750,790 to Cresswell-Clough and U.S. Pat. No. 2,742,338. Since it is believed that the operation of this type of ticket dispenser is well known to those of skill in the art, only a brief discussion of the operation of the dispensing and indexing mechanism will be described herein.

When the arm 30 is pushed into the housing 12, the coins are moved into the housing 12 and fall into the bin 92 after being guided by the inner guide 90. At the same time, the movement of the arm 30 causes crossbar 30a to move inwardly allowing the spring to pivot the lever 94 about the shaft 96. The movement of the lever 94 in this manner pivots the arm 98 clockwise about the shaft 96. The movement of arm 98 in the clockwise direction allows the hook to engage with a cam notch provided in the inner section 80a of the cam 80.

As the arm 30 is pushed further into the housing 12, the arm 106 is caused to pivot about the shaft 96. The pivotal movement of the arm 106 causes the arm to abut against the stud 102a provided on the arm 102. This in turn causes the arm 102 to pivot in a clockwise direction shown by arrow 130 about the shaft 112 thereby winding the spring 102b. The movement of the arm 102 in this manner causes the teeth 114 to mate with the gear section 80c of the cam 80 causing the cam section 80c to rotate counter-clockwise. Rotation of the section 80c in this manner does not cause the dispensing shaft 78 nor the other cam sections to rotate. However, as the gear section rotates so does the protrusion 80d and hence, the pawl 80e. After a predetermined angle of rotation has occurred, the pawl falls into a cam notch provided in the outer section 80b preventing the gear section 80c from further rotation. This limits the rotation of the gear section 80c and hence the winding of the spring 102a provided on the arm 102 so that only one ticket is dispensed at a time.

After the coins have been deposited in the bin 92, the arm 30 is allowed to be retracted from the housing 12 and is biased to this position by the spring 30c. Movement of the arm 30 in this manner causes the crossbar 30a to pull the lever 94 thereby pivoting it about the shaft 96 in a counter-clockwise direction. The pivoting action of the lever 94, pivots the arm 98 about the shaft 96 and removes the hook 100 from engagement with the cam notch formed in cam section 80a.

Once the hook 100 is released from the cam notch 80a, the cam 80 is free to rotate. Once released, the stored energy in the spring 102b causes the arm 102 to pivot counter-clockwise about the shaft 112 and thereby causes the gear section 80c and cam to rotate clockwise. Rotation of the gear section 80c in this manner rotates the dispensing shaft 78. Also, the stud 102a moves to its initial position, thereby pushing arm 106 to its initial position so that when the arm 30 is pushed into the housing once again, the lever 94 contacts the stud 102a to cause the arm 102 to wind the spring.

As the shaft 78 rotates, the pinwheels 77 rotate clockwise, thereby dispensing a parking ticket 70 out of the housing 12 via the slot 46. A user may then tear the dispensed ticket 70 from the tickets remaining within the housing 12 via the perforations.

Figure 5:
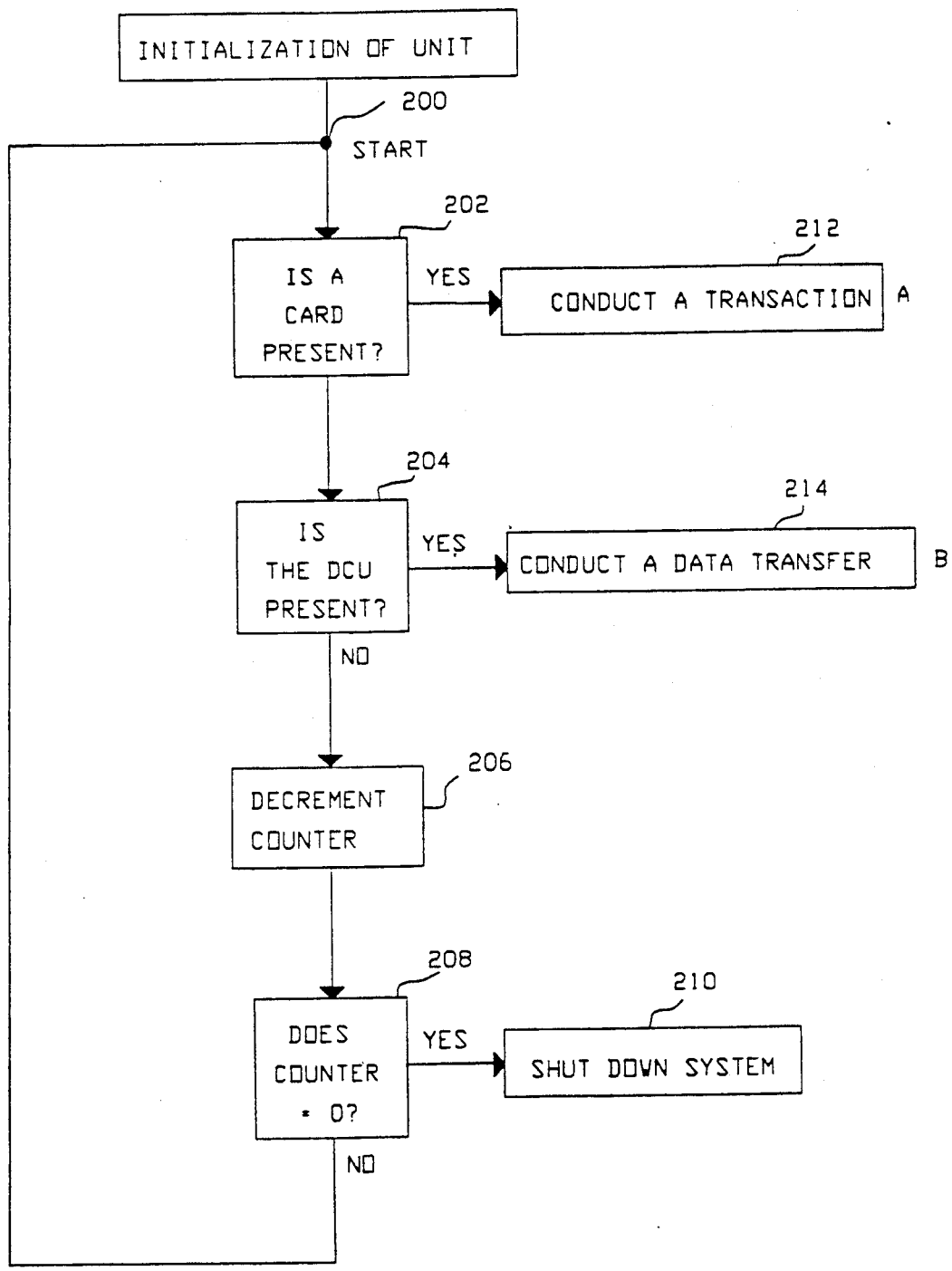
FIGS. 5 to 9 are flow charts illustrating the operation of the parking ticket dispenser illustrated in FIG. 1.

The batteries 64a, 64b are connected to the microprocessor-based circuit 69, so that the credit card reader 36 becomes operational as shown by point 200 in FIG. 5. Thereafter, the microprocessor-based circuit 69 communicates with the card reader 36 to determine whether or not a credit card has been inserted into the slot 38 as shown by block 202. If a credit card is not present, the microprocessor-based circuit examines the parking ticket dispenser to determine if a remote reading device is connected thereto via output part 122 as illustrated at block 204. If a remote reading device is not connected thereto, a counter is decremented (block 206) and the counter value is examined (block 208). If the counter value is not equal to zero, the software in the dispenser proceeds back to the start position 200. However, if the counter value is equal to zero the powering of the dispenser 10 will terminate (block 210). The value of the counter is initially set to a value which will cause the powering of the dispenser to shut off after 5 seconds occur without any use of the dispenser.

Figure 6:
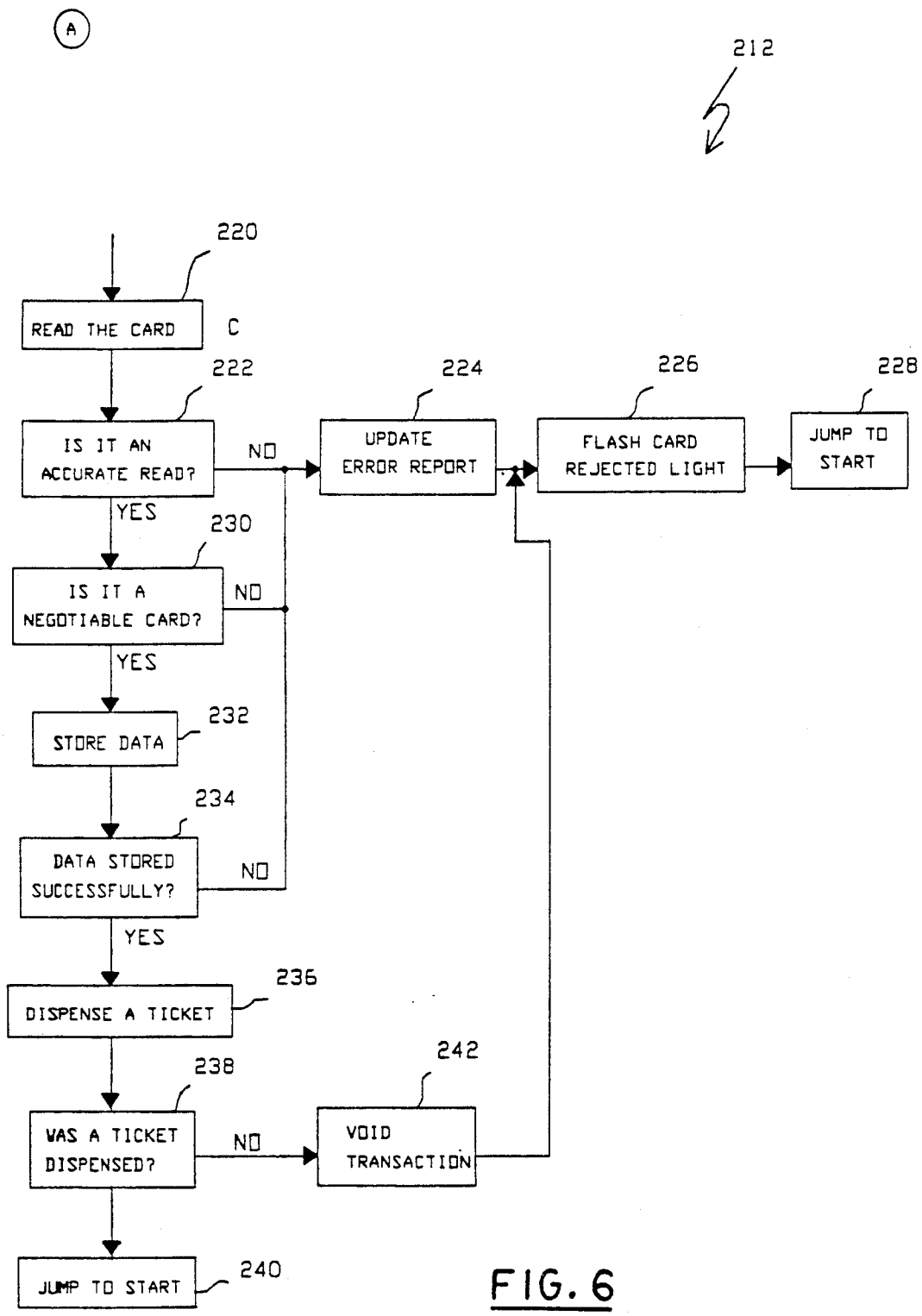
Figure 7:
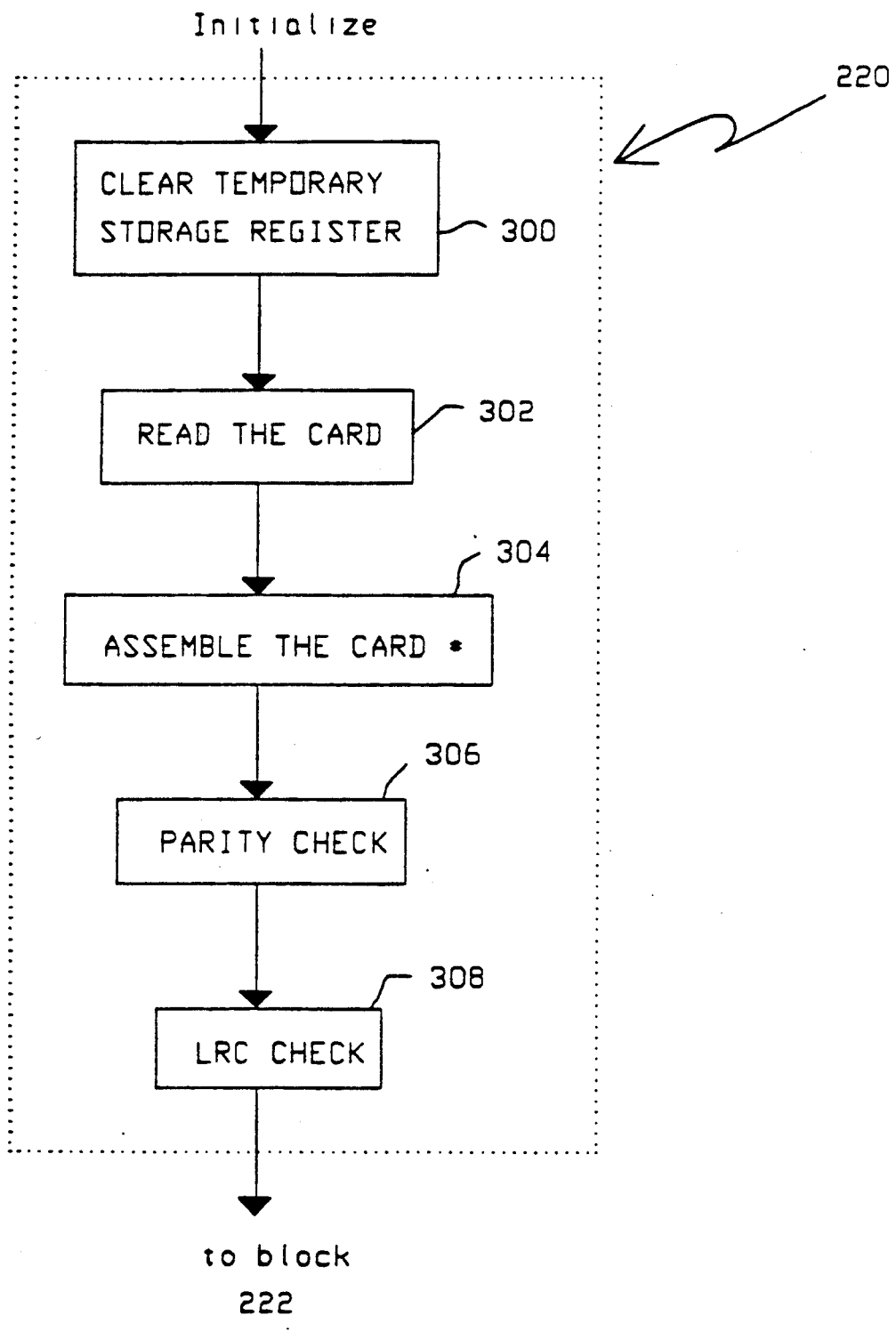
Figure 8:
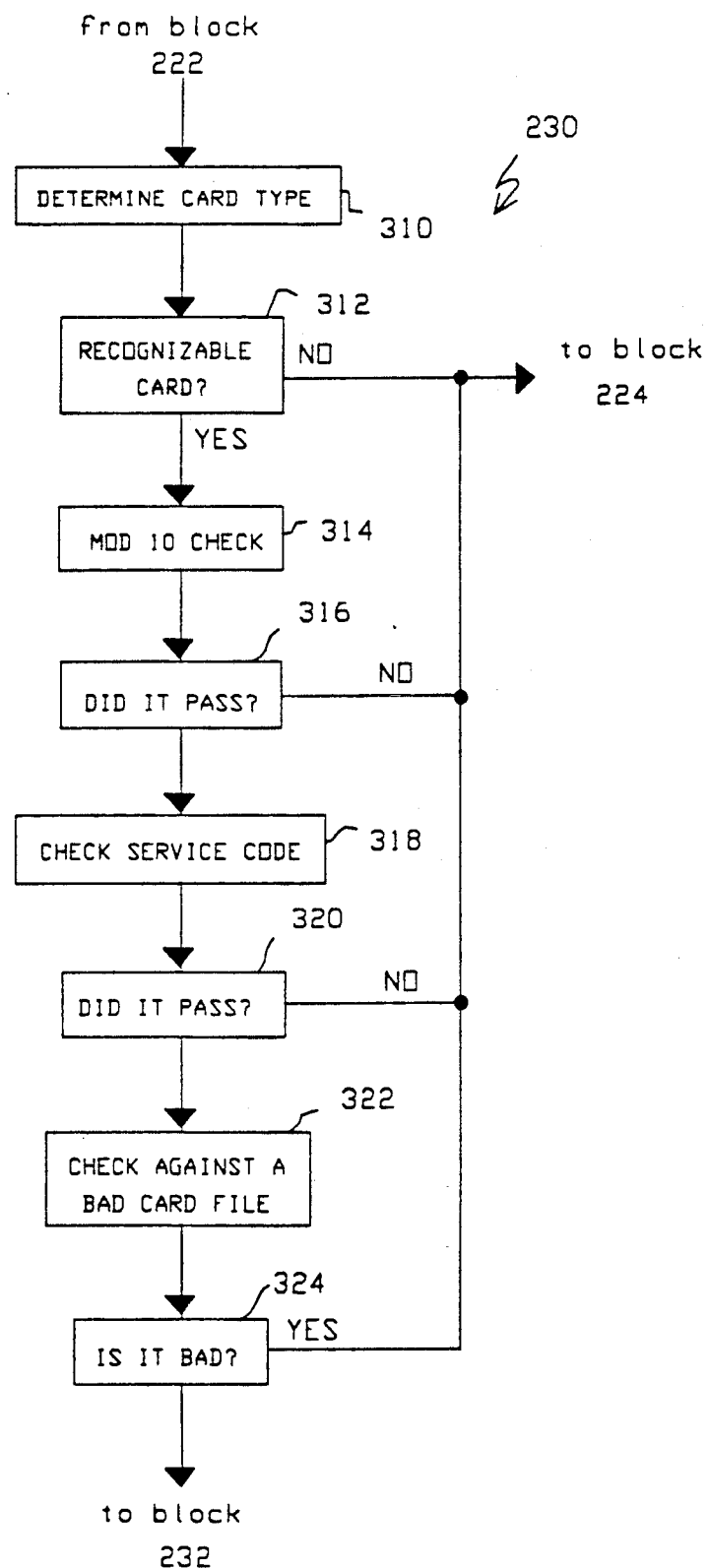

When a credit card is detected as being present in the slot 38 of the card reader 36, the software in the microprocessor based circuit proceeds to a "Conduct Transaction Routine" (block 212). The Routine is better illustrated in FIG. 6. As can be seen, after the Routine 212 commences, the credit card is firstly read (block 220). The steps involved in reading the circuit card are shown in FIG. 7. Firstly, a storage register is cleared and the numbers stored on the credit card are read (blocks 300 and 302). Thereafter, the number read from the credit card is assembled and the parity is checked (blocks 304 and 306). Once the parity is checked, a Longitudinal Redundancy Check (LRC) is performed (block 308) to ensure that no data is lost during the reading of the track of data recorded on the credit card. Once complete, the above checks are examined to determine if any errors occurred and hence, to determine if the credit card was read accurately. If any errors are detected, the software updates an error report (block 224) and generates a flag which is used to cause the red LED to flash (block 226). This indicates to the user that the credit card inserted into the slot was not considered valid. The software then returns to the initialization program at point 200 (block 228). However, if no errors are detected, the credit card is examined to determine if it is negotiable (block 230). The steps in determining the card type are better illustrated in FIG. 8.

To determine if the credit card is negotiable, the card type is firstly examined, i.e. Mastercard (Trademark), Visa (Trademark), Amex (Trademark), etc., to determine if the credit card type is valid (blocks 310 and 312). If the credit card is not valid, the error report is updated (block 224) and the software reverts to point 200 via blocks 226 and 228. If the credit card is detected as being valid, a mod 10 check is performed on the card (block 314) and the check is examined to determine if the result is valid (block 316). If the card does not pass the check, the error report is updated (block 224) and the software reverts back to the initialization point 200 via blocks 226 and 228. However, if the card passes the mod 10 check, the service code recorded on the credit card which defines the applications available to the cardholder is checked (block 318) and examined to determine if the code is valid (block 320). If the credit card has a valid service code, the verification of the card proceeds to the next stage. However, if the service code does not pass the check, the error report is updated (block 224) and the program reverts back to the initialization point 200 via blocks 226 and 228. Once the service code has been checked and determined satisfactory, the credit card is compared with a list of bad card numbers stored in a file (block 322) to determine if the credit card is invalid (block 324). If the credit card matches one of the numbers stored therein, the card is rejected and the error report is updated (block 274). Thereafter, the program reverts back to the initialization stage 200 via blocks 226 and 228.

However, if the credit card is determined valid, the read credit card data is stored in the memory of the microprocessor-based circuit 69 to record a parking meter transaction (block 232). Once this has been done, the memory is checked to ensure that the data has been stored successfully (block 234). If the data is detected as not having been stored properly, the error report is updated (block 224) and the program reverts back to the initialization stage 200. However, if the data has been stored successfully, the microprocessor-based circuit 69 operates the solenoids so that a parking ticket is dispensed in the manner described hereinafter.

In particular, the microprocessor-based circuit 69 provides control signals to energize the solenoid 116 which in turn pivots the arm 102 about shaft 112 to rotate the gear section 80c in the same manner previously described so that the spring 102b is wound. Although the hook 100 is not pivoted to engage the cam notches in cam section 80a, it should be realized that the arm 106 is maintained in the position shown in FIG. 3. This of course maintains section 106b of arm 106 in engagement with a cam notch formed in cam section 80b, preventing rotation of cam sections 80a, 80b as section 80c rotates thereby allowing the spring 102b to be wound. The pivoting of the arm 102 causes the lower end of the arm to engage with the sensor switch 120. The microprocessor-based circuit 69 monitors the switch 120 until it is debounced and deenergizes solenoid 116. After this occurs, the microprocessor-based circuit 69 energizes solenoid 108 causing arm 106 to be moved upwardly thereby releasing section 106b from the cam notch. When this occurs, the gear sections 80a and 80c are then free to rotate and the same interactions previously described occur so that a parking ticket is dispensed. The microprocessor-based circuit 69 will attempt the above operations four times to dispense a ticket if the solenoids do not function properly before a transaction is aborted. The above described operation is represented by blocks 236 and 238.

After this, the software in the parking ticket dispenser reverts to the initialization point 200 as shown by block 240. If a parking ticket 70 is detected as having not been dispensed when the mechanism 72 moves in this manner, the stored transaction is deleted from the memory (block 242) and the software reverts back to the initialization stage 200 via blocks 226 and 228.

Figure 9:
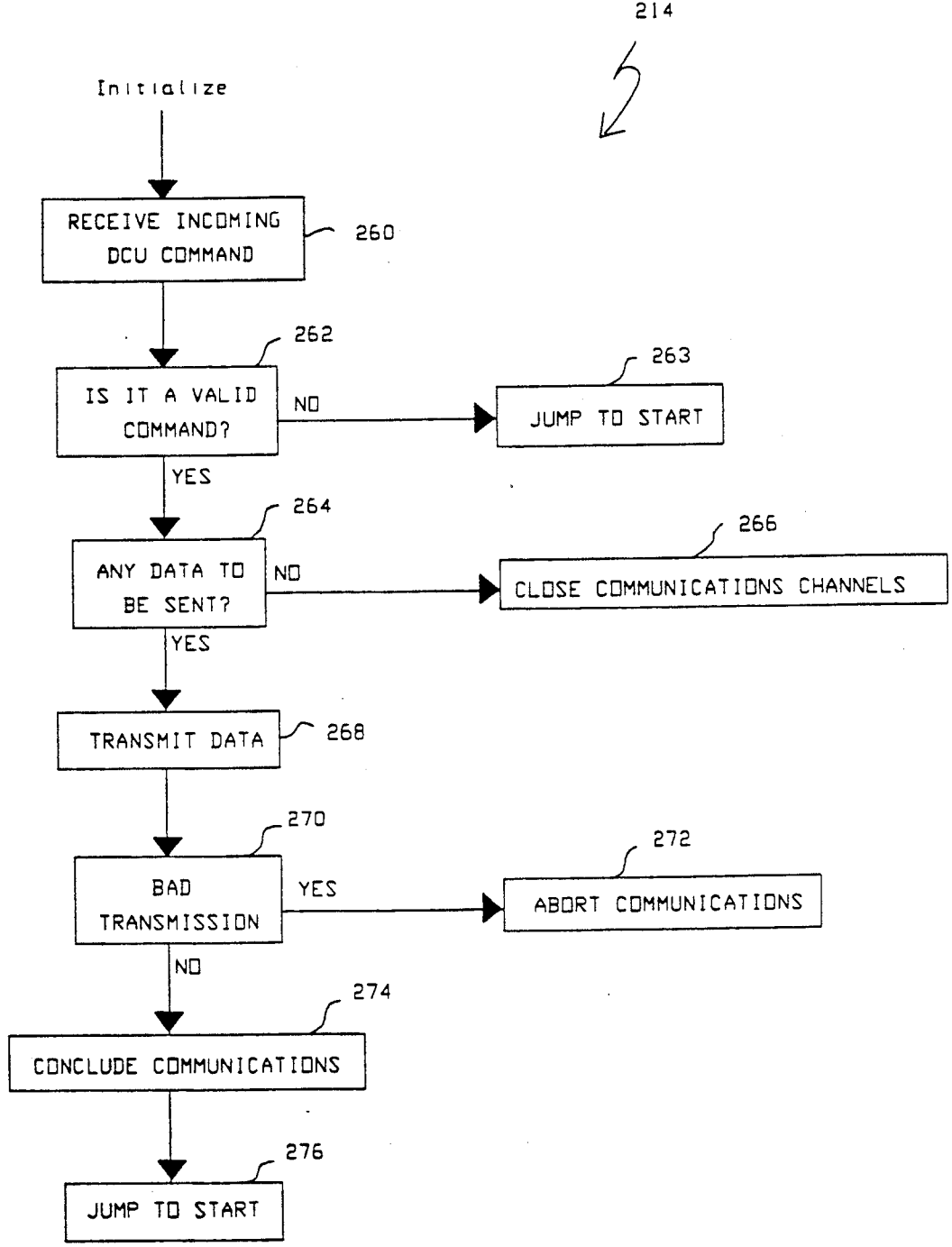

If a remote reading device is detected as being in communication with the microprocessor-based circuit via the output port 122 (block 204), the parking ticket dispenser 10 commences a "Data Transfer Routine" as shown at block 214. This Routine is better illustrated in FIG. 9. When a remote reading device is connected to the dispenser 10, the software awaits for the receipt of commands from the reading device (block 260). When commands are received, they are checked to determine if the commands are valid (block 262). If the received commands are not valid, the software jumps to the initialization stage 200 as shown by block 263. If valid commands are received the microprocessor-based circuit examines the command to determine if data is to be transferred to the reading device from the memory in the microprocessor-based circuit (block 264). If no data is to be transmitted, the communications channel provided in the microprocessor-based circuit is closed (block 268). If data is to be transferred from the memory of the microprocessor-based circuit 69 to the reading device, the communications channel is maintained operational and, the data is transmitted to the receiving device (block 268). Once the data has been transmitted, the data received in the reading device is compared with the transmitted data stored in the microprocessor-based circuit 69 to determine if the transmission of the information has occurred without error (block 270). If errors are detected in the transfer of data, the communications are aborted (block 272). However, if the transmission of the data is detected as being valid, the communications link is closed and the information stored in the microprocessor-based circuit 69 that was transferred to the reading device without error is erased (block 274). Once this has been done, the microprocessor-based circuit 69 moves to the initialization condition 200 as shown by block 276.

Figure 10:
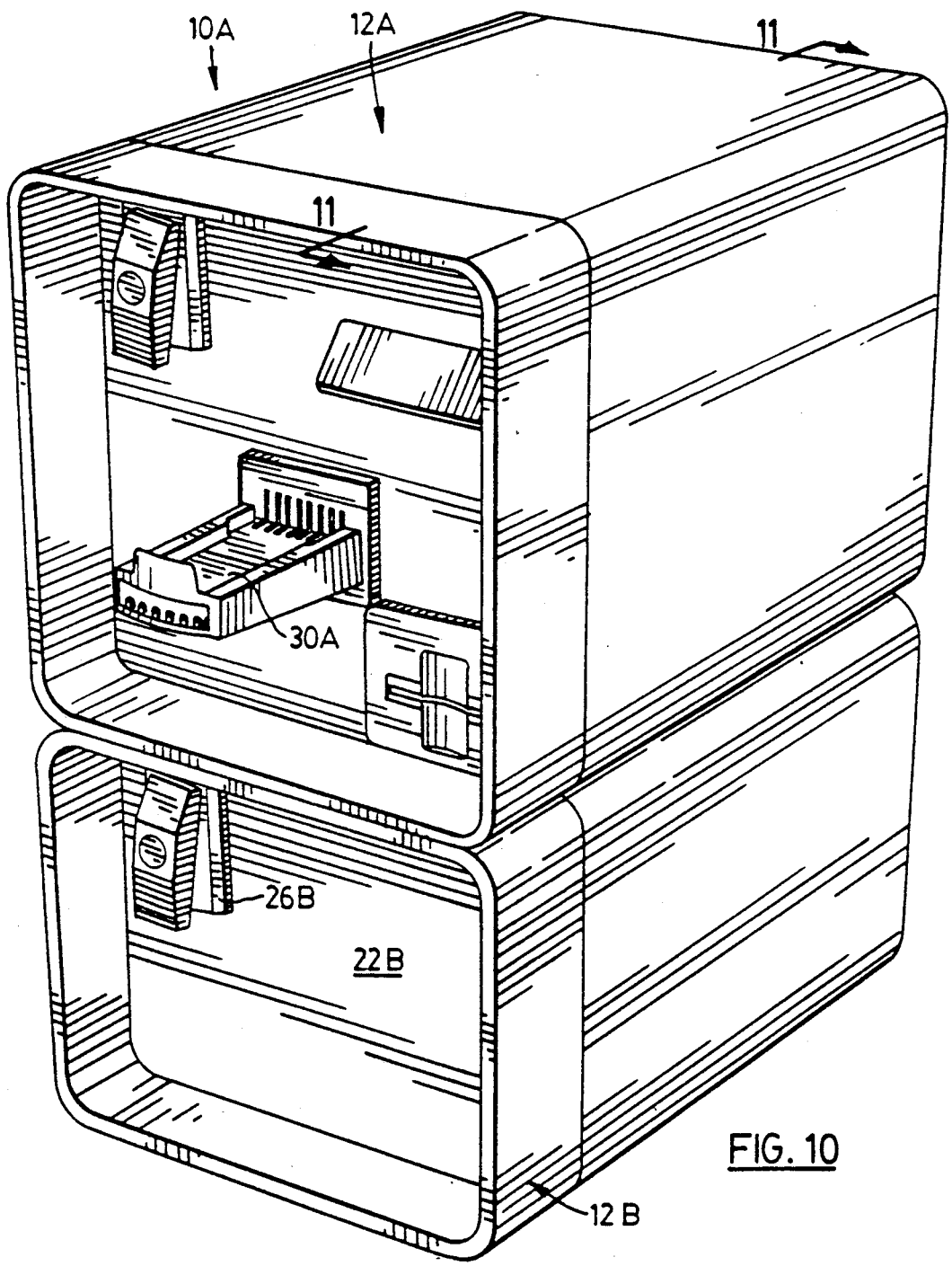
FIG. 10 is a perspective view of another embodiment of a parking ticket dispenser.
Figure 11:
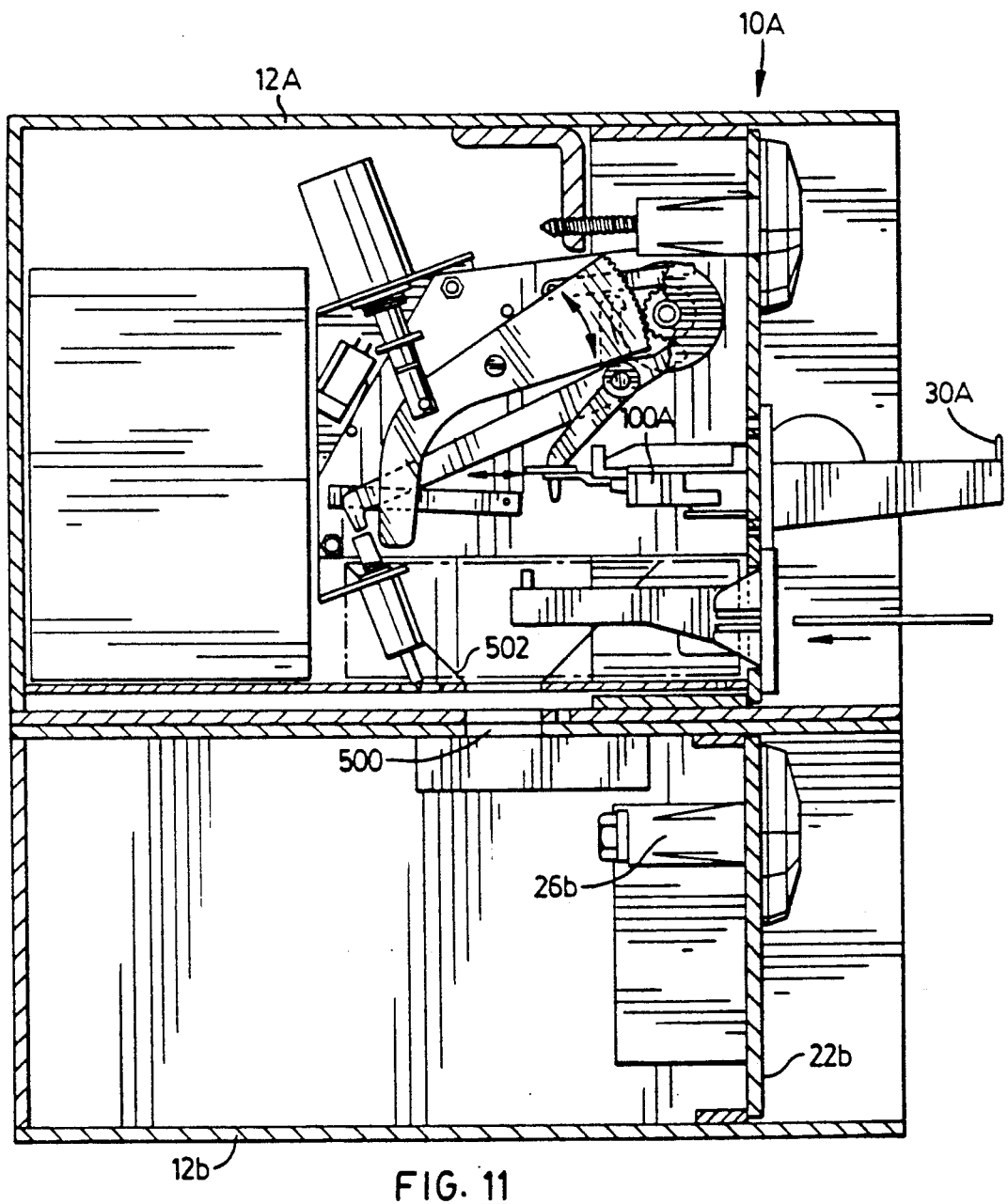
FIG. 11 is a sectional view of the dispenser illustrated in FIG. 10 taken along line 11—11.

Referring to FIGS. 10 and 11 another embodiment of the present dispenser is shown. In this embodiment like reference numerals will be used to indicate like components with an "A" added for clarity. As can be seen, the parking ticket dispenser 10A is provided with a pair of housings 12A and 12B disposed one above the other with housing 12a accommodating a ticket dispensing mechanism identical to that shown in the previous embodiment. The two housing communicate via an opening 500 provided therein. The lower housing 12B functions as a coin bin and has a front wall 22B hinged to one side of the housing. A locking mechanism 26B is provided so that the front wall 22B can be maintained in a closed position to prevent access to the bin. A funnel 502 extends upwardly from the opening 500 and is located adjacent the inner guide 100A of the coin receptacle 28A. When coins are placed in the slots and the arm 30A is pushed into the housing 12A, the coins are guided towards the funnel 502 and released from the inner guide. Once released, the coins fall into the funnel and are directed into the bin via the opening. This allows access to the different housings to be controlled.

The present parking ticket dispenser provides advantages in that parking tickets can be purchased by a user using either coin money or credit cards. This overcomes many disadvantages in conventional parking ticket dispensers by allowing the consumer to purchase the parking ticket in a manner which is convenient. Moreover, the parking ticket dispenser incorporates conventional ticket dispensing technology with a microprocessor-based circuit and a compact dispensing mechanism to provide an inexpensive device.

It should be apparent to one of skill in the art that the present invention can be modified without departing from the scope thereof as defined by the appended claims.

I claim:

1. A ticket dispenser of the type to dispense a ticket upon receipt of payment of a required fee comprising:
   a housing;
   a credit card reader disposed in said housing and adapted to receive and read a credit card inserted therein;
   processing means in communication with said credit card reader and detecting a valid credit card received by said credit card reader;
   memory means operable to store a credit card transaction in the amount of said required fee therein upon reading of a valid credit card;
   monetary receiving means in the form of a coin receptacle disposed on said housing to receive monetary payment of said required fee;
   payment detection means for detecting payment of said required fee via one of a credit card and monetary payment, wherein said payment detection means includes means associated with said coin receptacle for detecting payment of said required fee and a microprocessor-based circuit constituting said processing and memory means in communication with said credit card reader for detecting and registering payment of said required fee via a credit card;
   dispensing means responsive to said payment detection means and operable to dispense a ticket upon detection of payment of said required fee by said payment detection means, wherein said dispensing means is in the form of a dispensing and indexing mechanism, said dispensing and indexing mechanism being responsive to movement of said coin receptacle and the output of said microprocessor-based circuit and dispensing a ticket upon payment of said required fee,
   wherein said dispensing and indexing mechanism includes a lever in communication at one end with said arm and pivoting upon movement of said arm into said housing, the other end of said lever engaging with a first section of a cam to inhibit rotation thereof upon pivoting of said lever,
   a second arm in communication with said lever, said second arm pivoting in one direction in response to pivotal movement of said lever, said second arm causing a second section of said cam to rotate in said one direction upon pivotal movement thereof, and
   biasing means acting against the pivotal movement of said second arm wherein pivotal movement of said lever to disengage the other end thereof from said first section permits said second arm to pivot in the other direction under the influence of said biasing means and thereby rotate said cam in said other direction to dispense a ticket;
   wherein said dispensing and indexing mechanism further includes first activation means responsive to said output of said microprocessor-based circuit and operable to pivot said second arm independent of said lever to rotate said second section of said cam in said one direction;
   a third arm having one end in communication with said second arm, the other end thereof engaging with a third section of said cam rigidly connected to said first section, said third arm being pivotable to disengage said other end upon pivotal movement of said lever; and
   second activation means responsive to said output of said microprocessor-based circuit and being in communication with the one end of said third arm, said second activation means being operable to pivot said third arm to disengage the other end thereof from said third section thereby permitting said second arm to pivot in the other direction under of said biasing means; and
   wherein said coin receptacle includes a guide extending forwardly of said housing and an arm slidable along said guide into said housing and having means for receiving said required fee, said arm being capable of sliding into said housing upon receipt of payment of said required fee, wherein movement of said arm into said housing causes said dispensing and indexing mechanism to dispense a ticket.

2. The dispenser as defined in claim 1 further comprising switch means in communication with said microprocessor-based circuit and said second arm, said switch means providing signals to said circuit upon pivoting of said second arm to rotate said cam in said one direction, said microprocessor-based circuit de-energizing said first activation means and energizing said second activation means upon receipt of said signals.

3. The dispenser as defined in claim 2 wherein said first and second activation means are in the form of solenoids.

4. The dispenser as defined in claim 3 wherein said switch means is in the form of a micro-switch.

5. The dispenser as defined in claim 1 wherein said cam rotates a shaft upon rotation thereof in the other direction, said shaft having spaced wheels mounted thereon engaging with said tickets wherein rotation of said shaft rotates said wheels to dispense a ticket.

6. The dispenser as defined in claim 3 further including an isolated power supply energizing said microprocessor-based circuit and said solenoids.

7. The dispenser as defined in claim 1 further comprising sensing means detecting whether a ticket has been dispensed after a credit card transaction has been stored in said memory means; and
   means for voiding said credit card transaction stored in said memory means if a ticket is not dispensed by said dispensing means.

8. The dispenser as defined in claim 1 further comprising a data output port operable to receive a remote reading device, said processing means allowing said remote reading device to receive and store the credit card transactions stored in said memory means.

9. The dispenser as defined in claim 1 wherein said payment detection means, said monetary receiving means, said credit card reader and said microprocessor-based circuit are mounted on a shelf disposed within said housing, said housing including a door moveable between open and closed positions to permit access to said shelf.

10. The dispenser as defined in claim 9 wherein said shelf is slidable along rails disposed within said housing when said door is in said open position to facilitate access thereto.

11. The dispenser as defined in claim 7 wherein said means for voiding a credit card transaction is constituted by said processing means, said processing means deleting said credit card transaction stored in said memory if a ticket is not dispensed by said dispensing means.

12. The dispenser as defined in claim 8 wherein said processing means receives commands from said remote reading device to determine the mode of operation thereof and permits said credit card transactions stored in said memory means to be conveyed to said remote reading device when said remote reading device is an appropriate mode.

13. The dispenser as defined in claim 12 wherein said processing means conveys copies of said credit card transactions stored in said memory means to said remote reading device and wherein one of said processing means or a processor in said remote reading device compares the credit card transactions stored in said memory means with the copies received by said remote reading device to ensure that said credit card transactions are copied and stored correctly in said remote reading device.

14. The dispenser as defined in claim 13 wherein said processing means inhibits said output port upon detecting that said credit card transactions are not copied and stored correctly in said remote reading device.

15. The dispenser as defined in claim 14 wherein said credit card transactions are deleted from said memory means by said processing means when said transactions are detected as being copied and stored correctly in said remote reading device.

16. The dispenser as defined in claim 15 wherein said memory means further stores a bad card file, said processing means comparing information recorded on the credit card received in said credit card reader with data in said bad card file to detect unauthorized credit cards, said processing means denying said credit card when said information recorded on said credit card received by said credit card reader corresponds with data in said bad card file.

17. The dispenser as defined in claim 1 further including a pair of solenoids in communication with said microprocessor-based circuit, one of said solenoids being energized by said microprocessor-based circuit upon storing a credit card transaction in said memory means and conditioning said dispensing and indexing mechanism to dispense a ticket, said one solenoid being de-energized and the other solenoid being energized upon dispensing of said ticket, said other solenoid conditioning said dispensing and indexing mechanism to an initial condition to permit said dispenser to dispense a ticket upon receipt of another payment of said required fee via a credit card or monetary payment.

18. The dispenser as defined in claim 1 wherein said processing means and said memory means are constituted by a microprocessor-based circuit and wherein said dispensing means is in the form of a dispensing and indexing mechanism, said dispensing means further including a pair of solenoids in communication with said microprocessor-based circuit, one of said solenoids being energized upon storing of a credit card transaction in said memory means and conditioning said dispensing and indexing mechanism to dispense a ticket, said one solenoid being de-energized and said other solenoid being energized upon dispensing of said ticket, said other solenoid conditioning said dispensing and indexing mechanism to an initial condition to permit said dispenser to disperse a ticket upon receipt of another payment of said required fee via a credit card or monetary payment.

19. A ticket dispenser of the type to dispense a ticket upon receipt of payment of a required fee comprising:
a housing;
a credit card reader disposed in said housing and adapted to receive and read a credit card inserted therein;
a microprocessor-based circuit in communication with said credit card reader and operable to detect a valid credit card and store a credit card transaction therein upon reading of a valid credit card;
a money receptacle disposed on said housing to receive monetary payment of said required fee, said receptacle having an arm movable into said housing to deposit said required fee therein;
payment detection means in communication with said microprocessor-based circuit and said money receptacle for detecting payment of said required fee via one of a credit card and monetary payment; and
a dispensing and indexing mechanism operable to dispense a ticket upon receipt of payment of said required fee, said dispensing and indexing mechanism including a lever in communication at one end with said arm and pivoting upon movement of said arm into said housing, the other end of said lever engaging with a first section of a cam to inhibit rotation thereof upon pivoting a said lever;
a second arm in communication with said lever, said second arm pivoting in one direction in response to pivotal movement of said lever, said second arm causing a second section of said cam to rotate in said one direction upon pivotal movement thereof;
biasing means acting against the pivotal movement of said second arm wherein pivotal movement of said lever to disengage the other end thereof from said first section permits said second arm to pivot in the other direction under the influence of said biasing means and thereby rotate said cam in said other direction to dispense a ticket;
first activation means responsive to the output of said microprocessor-based circuit and operable to pivot said second arm independent of said lever to rotate said second section of said cam in said one direction;
a third arm having one end in communication with said second arm, the other end thereof engaging with a third section of said cam rigidly connected to said first section, said third arm being pivotal to disengage said other end upon pivoting of said lever; and
second activation means responsive to the output of said microprocessor-based circuit and being in communication with said one end of said third arm, said second activation means being operable to pivot said third arm to disengage the other end thereof from said third section thereby permitting said second section to rotate in the other direction under the influence of said biasing means to dispense a ticket.

20. The dispenser as defined in claim 19 further comprising switch means in communication with said microprocessor-based circuit and said second arm, said switch means providing signals to said microprocessor-based circuit upon pivoting of said second arm to rotate said cam in said one direction, said microprocessor-based circuit de-energizing said first activation means and energizing said second activation means upon receipt of said signals.

21. The dispenser as defined in claim 20 wherein said first and second activation means are in the form of solenoids.

22. The dispenser as defined in claim 21 wherein said switch means is in the form of a micro-switch.

23. The dispenser as defined in claim 19 wherein said cam rotates a shaft upon rotation thereof in the other direction, said shaft having spaced wheels mounted thereon engaging with said tickets wherein rotation of said shaft rotates said wheels to dispense a ticket.

24. The dispenser as defined in claim 21 further including an isolated power supply energizing said microprocessor-based circuit and said solenoids.

* * * * *